Sept. 27, 1949.  E. J. KRUPP  2,483,208
FLEXIBLE JAW CHUCK
Filed March 10, 1947
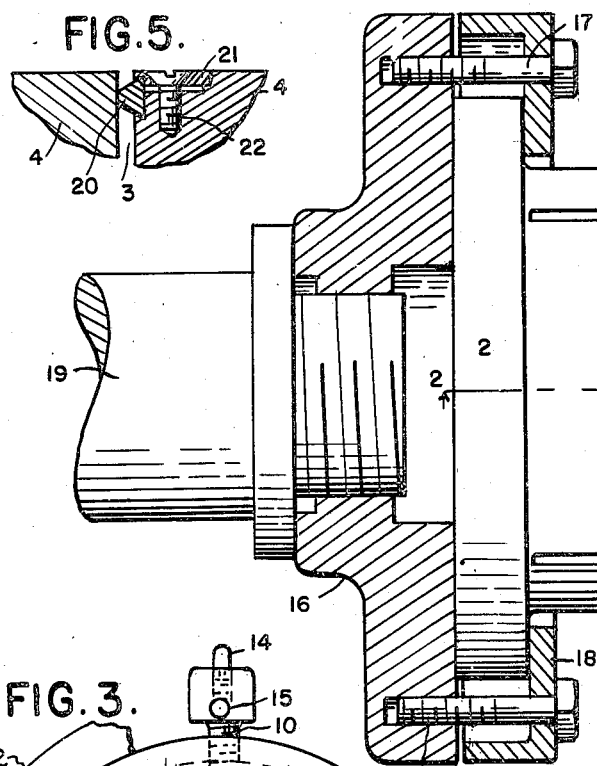
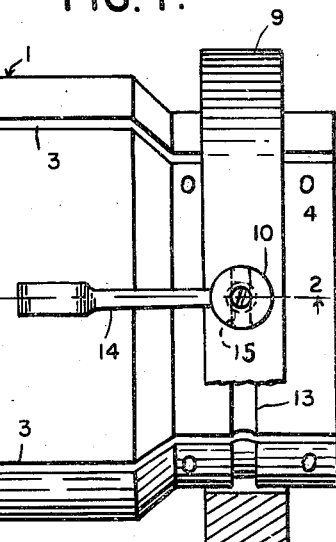
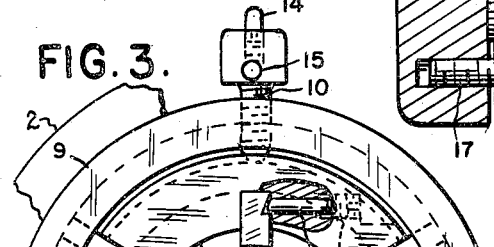
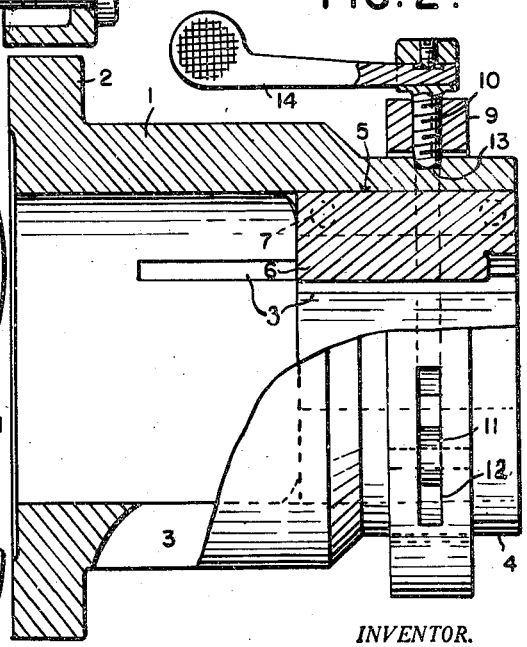
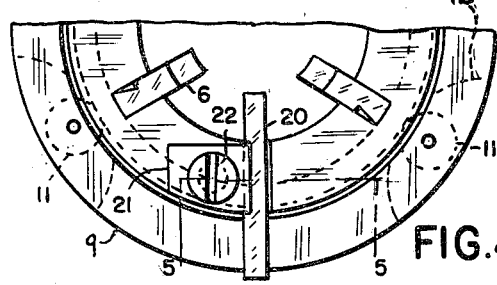
*INVENTOR.*
ERNEST J. KRUPP
BY
*ATTORNEY*

Patented Sept. 27, 1949

2,483,208

UNITED STATES PATENT OFFICE 2,483,208

FLEXIBLE JAW CHUCK

Ernest J. Krupp, East Detroit, Mich.

Application March 10, 1947, Serial No. 733,456

9 Claims. (Cl. 279—41)

This invention relates to chucks and particularly chucks having jaws flexible to and from the chuck axis.

An object of the invention is to equip a flexible jaw chuck with a simple provision for flexing the jaws to precisely the same extent and thus accurately establishing a chucked work piece or tool at the chuck axis.

Another object is to provide a flexible jaw chuck having its jaws so operable that the operator may nicely regulate the gripping pressure applied to a chucked work piece or tool.

Another object is to provide a flexible jaw chuck in which the jaws have only a slight range of flexure, there being a provision however for gripping parts of widely varying diameter.

Another object is to mount a non-flexible collar on a set of flexible chuck jaws in a surrounding relation to such jaws, and to induce a uniform inward flexure of the several jaws by a reaction set up between one of the jaws and the collar.

Another object is to equip a chuck having an odd number of flexible jaws with a calipering tooth diametrically opposed to one of said jaws.

These and various other objects are attained by the construction hereinafter described and illustrated in the accompanying drawing, wherein:

Fig. 1 is a top plan view of my improved chuck, sectionally showing a mounting for the chuck.

Fig. 2 is an axial sectional view of the chuck, taken on the line 2—2 of Fig. 1.

Fig. 3 is a front end view of the chuck, in partial section.

Fig. 4 is a partial front view showing installation of a calipering tooth.

Fig. 5 is a fragmentary cross section, taken on the line 5—5 of Fig. 4.

In these views, the reference character 1 designates an annular body having an exterior annular flange 2 at one end, and formed with a plurality of radial slots 3 (of which there are preferably three) extending from its other end. Jaws 4, formed by and between said slots, have a slight inward flexibility. It is preferred to extend said slots and jaws almost to the flange 2, the reinforcing effect of the flange rendering such extent feasible. The free end portions of the jaws are reduced in diameter both exteriorly and interiorly and have radial grooves 5 opening in their interior and end faces. These grooves snugly receive gripping teeth 6, formed preferably as rectangular plates elongated lengthwise of the chuck. Each such tooth is normally clamped in its groove 5 by a pair of screws 7 set into the corresponding jaw and acting on the tooth through sliding pins 8.

Freely surrounding the free end portions of the jaws is a ring 9 mounting a radial screw 10 engaging one of the jaws and further mounting a pair of rollers 11, each engaging one of the other jaws. The points of engagement of said screw and rollers with the jaws are preferably in radial planes bisecting the jaws, the ring having slots 12 receiving the rollers and the jaws being exteriorly formed with an annular groove 13 wherein said screw and rollers seat. The axes of the rollers are parallel to the chuck axis, thus adapting the rollers for a slight rolling travel circumferential to the corresponding jaws. The screw 10 is rotatable by a suitable handle 14, which may be set into either of two transverse diametrical sockets 15 in the outer end of the screw. The provision of a slight clearance between the ring 9 and the chuck jaws is vital, since the ring must undergo a slight travel across the chuck axis.

While said chuck may be variously mounted, its flanged end is shown in Fig. 1 seated against an adapter 16 and clamped to such adapter by bolts 17 engaging a ring 18 seating on the flange 2. The adapter is carried and driven by a spindle 19 which may be an element of any suitable machine tool, as a grinding machine or lathe.

Figs. 4 and 5 show a calipering tooth 20 adapted to be secured to and to project inwardly from one of the jaws in diametrical opposition to one of the teeth 6, when the capacity of the teeth is to be measured. Said calipering tooth occupies one of the slots 3 and is clamped to its supporting jaw by a plate 21 and screw 22.

The described chuck is adapted to very accurately establish a piece of work or a tool at the chuck axis in a quite simple manner. In order that the jaws undergo equal flexure, when the screw 10 is tightened against one jaw, it is essential to afford a slight anti-friction circumferential travel of the points of engagement of the other two jaws by the ring, since the ring has a slight bodily movement across the chuck axis, responsive to said screw. In absence of the rollers 11 or an equivalent, flexure of the screw-engaged jaw would materially exceed that imposed on the other jaws. Provision of the groove 13 in the jaws to receive the screw and rollers, prevents escape of the ring 9 from the jaws or shifting of such ring from its proper mounting on the jaws. To adapt the described chuck to various diameters of tools or work pieces, various sets of the teeth 6 may be provided, differing in their radial dimensions. The calipering tooth 20 is only applied when a measurement is to be taken, as to ascertain whether the inner ends of the teeth 6 have been ground to conform to a desired work or tool diameter. There is no necessity for removing any of the teeth 6 in using the calipering tooth.

What I claim is:

1. A chuck comprising an annular body having a plurality of substantially equidistant slots extending from one of its ends in substantial parallelism with the chuck axis and forming a set of radially flexible jaws, a ring surrounding such jaws, means carried by said ring for applying a pressure, directed substantially toward the chuck axis, to one of said jaws, and means for transmitting pressure acting substantially toward the chuck axis from the ring to each of the other jaws, said means including elements adapted to rotate about axes substantially parallel to the chuck axis.

2. A chuck as set forth in claim 1, said means for applying pressure to one of the jaws being a screw mounted substantially radially in said ring.

3. A chuck as set forth in claim 1, the chuck jaws being exteriorly formed with an annular groove, wherein said means for applying pressure and said means for transmitting pressure take effect on the jaws.

4. In a chuck as set forth in claim 1, a gripping tooth detachably mounted on and inwardly projecting from each of the jaws, the medial radial planes of said teeth and jaws being substantially coincident.

5. A chuck comprising an annular body having a plurality of substantially equidistant slots extending from one of its ends in substantial parallelism with the chuck axis and forming a set of radially flexible jaws, a ring surrounding such jaws, means carried by said ring for applying a pressure, directed substantially toward the chuck axis, to one of said jaws, and rollers rotatable in said ring about axes substantially parallel to the chuck axis and bearing respectively on the respective other jaws for transmitting pressure, acting substantially toward the chuck axis, from the ring to said other jaws.

6. A chuck comprising an annular body having a plurality of substantially equidistant slots extending from one of its ends in substantial parallelism with the chuck axis and forming a set of at least three radially flexible jaws, a ring surrounding such jaws, means carried by said ring for applying a pressure, directed substantially toward the chuck axis, to one of said jaws, and means for subjecting the several jaws to equal components of said applied pressure.

7. A chuck comprising an annular body having a plurality of substantially equidistant slots extending from one of its ends in substantial parallelism with the chuck axis and forming a set of radially flexible jaws, each jaw being formed in its inner face with a radial groove extending in parallelism with the chuck axis, a gripping tooth set into each such groove and inwardly projecting from the corresponding jaw, a ring surrounding such jaws, means carried by said ring for applying a pressure, directed substantially toward the chuck axis, to one of said jaws, and means for transmitting pressure acting substantially toward the chuck axis from the ring to each of the other jaws, said means including elements adapted to rotate about axes substantially parallel to the chuck axis.

8. A chuck comprising an annular body, slotted lengthwise from an end thereof and thereby forming an odd number of radially flexible jaws, means for flexing said jaws inwardly to the same extent, a gripping tooth carried by and inwardly projecting from each jaw, and a calipering tooth detachably carried by one of said jaws in a diametrically opposed relation to one of said gripping teeth.

9. A chuck comprising an annular body having a plurality of substantially equidistant slots extending from one of its ends in substantial parallelism with the chuck axis and forming a set of radially flexible jaws, a ring surrounding such jaws, the interior diameter of said ring materially exceeding the exterior diameter of the jaws, means carried by said ring for applying a pressure, directed substantially toward the chuck axis, to one of said jaws, and means for transmitting pressure acting substantially toward the chuck axis from the ring to each of the other jaws, said means including elements adapted to rotate about axes substantially parallel to the chuck axis.

ERNEST J. KRUPP.

REFERENCES CITED

The following references are of record in the file of this patent:

UNITED STATES PATENTS

| Number | Name | Date |
|---|---|---|
| 1,117,468 | Wilson et al. | Nov. 17, 1914 |